Sept. 14, 1937.   P. A. CHAMBERLAIN   2,092,955
MOTOR AND SPEED REGULATOR THEREFOR
Filed June 6, 1936   3 Sheets-Sheet 2
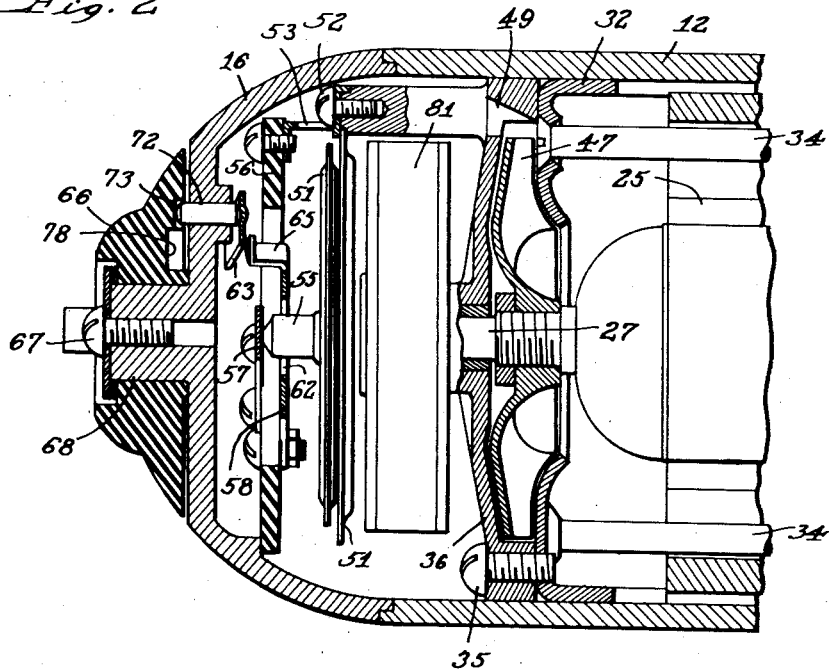
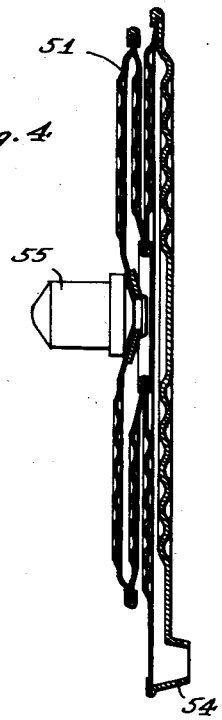
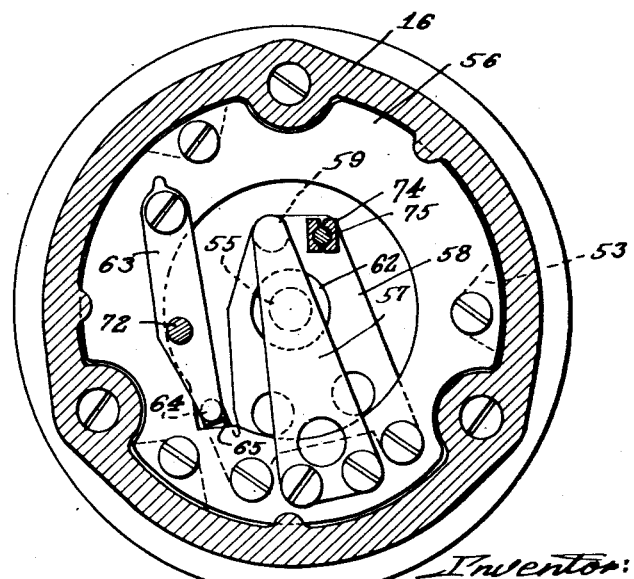
Inventor:
Paul A. Chamberlain
By
Wilson, Bowell, McKenna & Wintercorn
Attys.

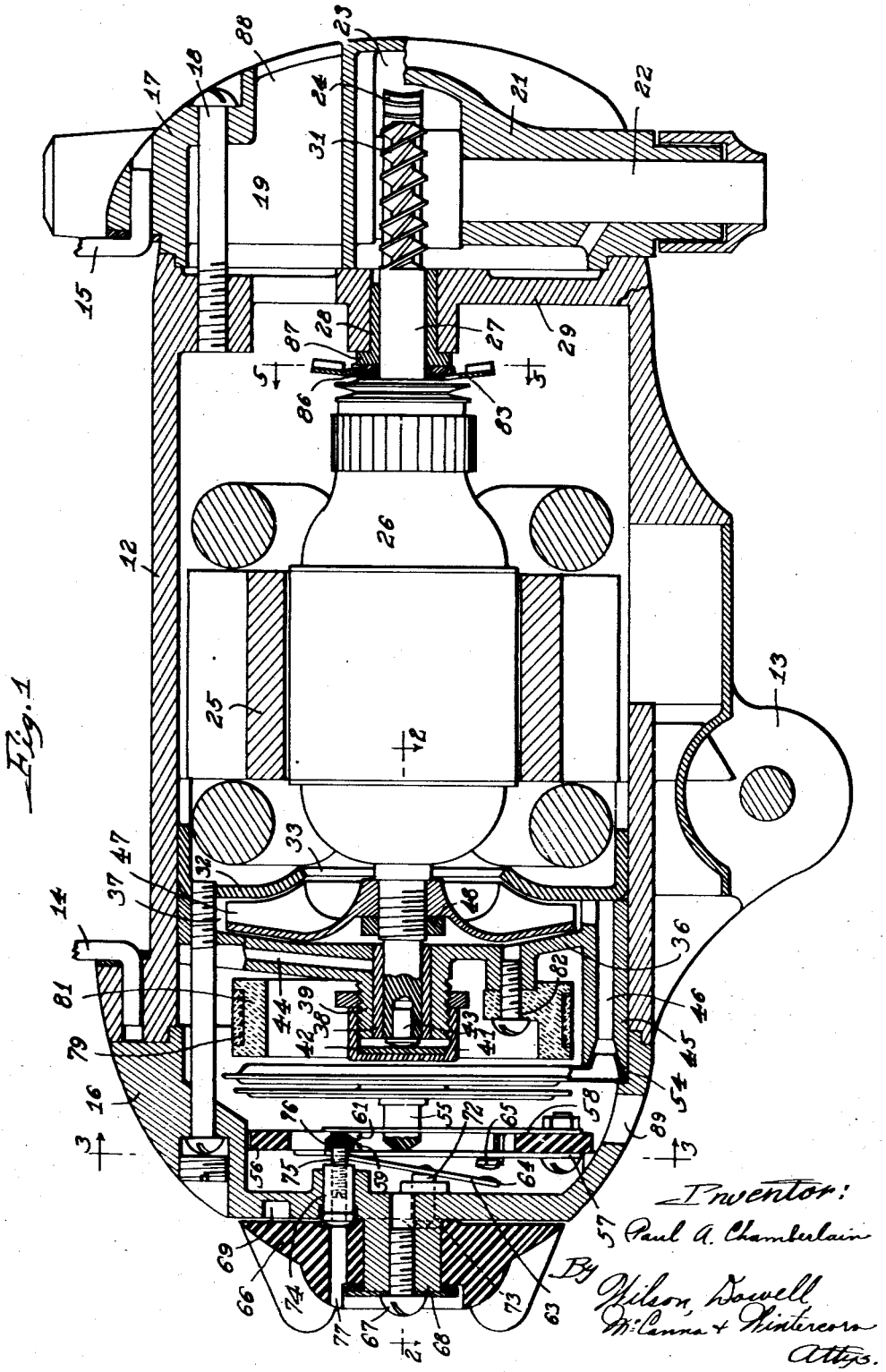

Sept. 14, 1937.  P. A. CHAMBERLAIN  2,092,955
MOTOR AND SPEED REGULATOR THEREFOR
Filed June 6, 1936  3 Sheets—Sheet 3
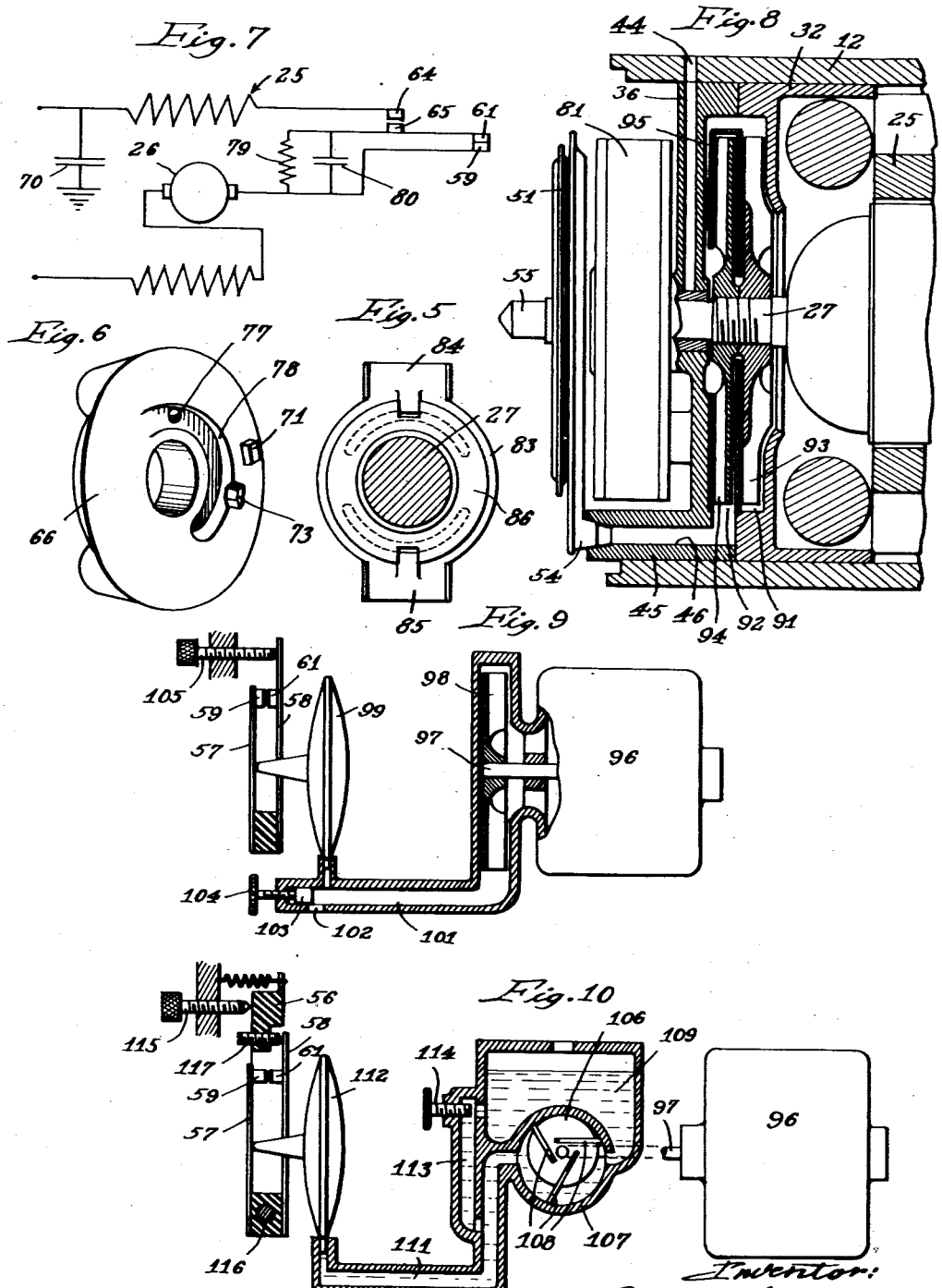

Patented Sept. 14, 1937

2,092,955

UNITED STATES PATENT OFFICE 2,092,955

MOTOR AND SPEED REGULATOR THEREFOR

Paul A. Chamberlain, Chicago, Ill., assignor to Chicago Flexible Shaft Company, Chicago, Ill., a corporation of Illinois Application June 6, 1936, Serial No. 83,884

4 Claims. (Cl. 171—229)

This invention relates to electric motors, and more particularly to a combination therewith of speed regulating means wherein the speed of the motor is variable and is controlled through fluid means.

An important object of the invention is the provision of a speed regulator of generally improved construction wherein the supply of current to the motor is regulated by fluid means to maintain a uniform motor speed.

Another object of the invention is the provision of a motor and speed regulator combined in a unitary structure of novel characteristics.

A further object of the invention is to provide a speed regulator for electric motors which will maintain the speed of the motor more nearly constant over a longer period of time and at any speed for which it may be set, than has heretofore been possible.

Another object of the invention is to provide a speed regulator of the automatic breaker type wherein the life of the contact points and other mechanical parts is materially increased over that of prior art constructions.

A still further object of the invention is the provision of a speed regulator having movable contacts for making and breaking the circuit through an electric motor to control the speed thereof, and fluid means of improved character for moving the contact.

I have also aimed to provide a speed regulator wherein pneumatic means of improved construction operates to control the speed of a motor.

A still further object of the invention is the provision of a speed regulator wherein a centrifugal brake selectively functions in the control.

Another aim of the invention is to provide a speed regulator having improved means for selecting desired speeds.

Other objects and advantages will become apparent from the following description and the accompanying drawings, in which—

Figure 1 is a section through a household mixer unit having a motor and speed regulator embodying my invention;

Fig. 2 is a section on the line 2—2 of Figure 1;

Fig. 3 is a section on the line 3—3 of Figure 1;

Fig. 4 is a section through an expansible element or bellows;

Fig. 5 is a section on the line 5—5 of Figure 1 showing the centrifugal brake;

Fig. 6 is a perspective view of the actuating knob;

Fig. 7 is a wiring diagram of the motor and speed control shown in Figure 1;

Fig. 8 is a fragmentary view of a construction similar to Figure 1 but embodying a two-stage impeller;

Fig. 9 is a diagrammatic view of a modified construction, and

Fig. 10 is a diagrammatic showing of a second modified construction.

The device shown in Figure 1 is a mixer unit as found in a well known type of household mixer for which this speed regulator was specifically developed and for which purpose it is particularly suited, though it will be understood that the general features of the invention are of wide application, and generally applicable to electric motors. It will also be understood that speed regulators of the make and break type are of particular merit in connection with a series or universal motor wherein the speed of the motor varies greatly with the load.

Directing attention now more particularly to Figure 1, the numeral 12 designates the frame, housing or case which, in this instance, carries the motor, speed regulator and certain gearing presently to be described. The lower side of the case carries a pair of spaced ears, one of which is shown at 13 for the purpose of supporting the mixer unit on a pedestal or stand. A handle, not shown, is rotatably supported on the upper side of the housing by means of handle straps 14 and 15 journaled in the casing as shown. The rear end of the casing comprises a cap 16 which substantially covers that end of the motor casing, while the front end of the casing comprises a cap 17 attached to the central portion of the casing by means of screws 18. The cap 17 carries a pair of laterally spaced upper bearings 19 and a pair of laterally spaced lower bearings 21 adapted to receive and support spindles 22, a gear chamber 23 being interposed between the upper and lower bearings and having worm gears 24 fixedly attached to the spindles 22 for the purpose of driving the same. A motor designated generally by the numeral 25 is carried in the central portion of the housing and has an armature 26 and shaft 27, the shaft being supported near its forward end in a bearing 28 carried on a spider 29. The forward end of the shaft 27 projects forwardly beyond the bearing 28 and has a worm 31 interposed between the worm gears 24 for the purpose of driving these gears. A disk 32 is positioned in the casing adjacent the rear end of the motor and has a central opening 33 for the passage of the shaft 27 and for a further purpose presently to be described. The disk 32 is attached to the central portion of the casing by means of screws 34 (Fig. 2). Positioned behind the disk 32 and attached thereto by means of screws 35 (Fig. 2) is a laterally disposed partition 36 having a recessed forward face 37 forming with the disk 32 an impeller housing. The rear end of the shaft 27 is journaled in the partition 36 in a bearing 38 carried in a boss 39. A cap 41 is threaded over the outer surface of the boss 39 and carries a wear plate 42 against which a thrust bearing 43 positioned in the end of the shaft 27 abuts. The partition 36 also has a channel 44 for supplying lubricant to the bearing. The partition also has a rearwardly disposed boss 45 having a channel 46 communicating with the chamber 37 for the purpose of transmitting air pressure, as will presently appear. A multi-blade impeller 47 is attached to the shaft 27 by means of a nut 48 and rotates with the armature shaft in the chamber 37. The partition 36 also has an opening 49 for the passage of air rearwardly from the impeller chamber.

A pressure responsive element, diaphragm or other pressure expansible element, such as an expansible bellows of the nature shown in Fig. 4, designated by the numeral 51, is positioned rearwardly of the partition 36 and is attached thereto by means of screws 52 and brackets 53. This bellows has rearwardly disposed portions formed of very thin metal so as to be capable of expansion under the pressure developed by the impellers 47, the bellows having an opening 54 for communication with the passage 46. A button of insulation 55 is attached to the rear face of the diaphragm as shown in Fig. 4, and is adapted to move longitudinally upon change of pressure within the diaphragm. A ring 56 of insulation material is carried by the brackets 53 and supported in a position spaced rearwardly from the bellows 51. Spring contact carriers 57 and 58 are attached to offset sides of the ring 56 and project inwardly across the open center of the ring and at their free ends carry contacts 59 and 61, the contact carrier 57 being adapted for engagement with the button 55, and the contact carrier 58 having an opening 62 for the passage therethrough of the button 55. The tension on the contact carriers 57 and 58 is such as to maintain the contacts closed whenever the button 55 is out of engagement with the contact carrier 57. The ring 56 also carries a switch lever 63 having a contact 64 adapted to engage a contact 65 connected to the contact carrier 58, the lever 63 being tensioned so as to normally maintain the contacts 64 and 65 open.

A knob 66 of insulation material, shown in perspective in Fig. 6, is attached to the rear end of the cap 16 by means of a screw 67, and a boss 68, the knob being rotatable on the boss 68 between limits as defined by the ends of a slot 69 in the cap 16 and a projection 71 on the knob 66 receivable in the slot. A pin 72 is positioned in the cap 16 and at its forward end bears against the switch lever 63. At its rear end it bears against the knob 66 forcing the switch lever 63 into a position in which the contact points 64 and 65 are closed. The knob has a recess 73 into which the rear end of the pin 72 may drop so as to permit the last mentioned contacts to open under the spring tension of the lever 63. This arrangement constitutes the switch for starting or stopping the motor. The cap 16 also carries a sleeve 74, slidable longitudinally, within which is threaded a screw 75 which carries an insulation button 76 adapted to engage the contact carrier 58. The rear end of the screw 75 is slotted for adjustment with a screw driver after assembly of the device, a hole 77 being provided in the knob 66 for this purpose. The rear end of the sleeve 74 is receivable in a groove 78 in the forward face of the knob 66 (see Fig. 6), the groove 78 being of progressively greater depth whereby rotation of the knob serves to adjust the position of the contact 61. This serves to vary the maintained speed of the motor, since through this adjustment a greater or lesser amount of movement of the button 55 is required to open the contacts 59 and 61, and this movement is dependent upon the pressure in the bellows and thus dependent upon the speed of the motor.

A resistance coil 79 is carried on a spool 81 which is fastened to the partition 36 by means of screws 82, which coil is interposed in a circuit supplying current to the motor when the contact points 59 and 61 are opened and the contacts 64 and 65 closed, as will hereinafter be more fully described. The numerals 70 and 80 designate condensers for preventing radio interference from the make and break mechanism.

A centrifugal brake is attached to the shaft 27, and in this instance consists of a slightly curved sheet metal disk 83 carried on the shaft 27, the disk having oppositely disposed outwardly projecting portions 84 and 85 which function as weight members. Carried on the disk 83 is a friction plate 86 adapted to be moved toward and away from the end 87 of the bearing 28 by movement of the weight members 84 and 85. This arrangement is such that at low speeds the tension of the disk 83 urges the plate 86 into frictional contact with the end of the bearing 28 so as to act as a brake upon the rotation of the armature. As the speed of the motor increases, the disk 83 tends to assume a plane shape, gradually reducing the frictional contact above mentioned until the plate 86 is entirely out of contact with the end of the bearing 87 allowing the armature to rotate freely.

In Figure 1 the parts are shown in the "off" position with the contacts 64 and 65 open and the contacts 59 and 61 closed. Upon rotation of the knob 66 through a slight degree of angularity the pin 72 moves out of the slot 73 causing the contacts 64 and 65 to be closed. Current will then flow to the motor through the contacts 59 and 61 causing the motor to start and pick up speed. When the speed of the motor is such that the impeller 47 develops a predetermined pressure in the bellows, as determined by the setting of the button 76, the contact points 59 and 61 will be opened, breaking this circuit through the motor. In this particular instance this speed may advantageously be about 300 R. P. M. Current will, however, continue to flow through the motor by way of the switch contacts 64 and 65 and the resistance 79. The resistance 79 is such that the speed of the motor would normally tend to increase after the opening of the contacts 59 and 61. However, the action of the breaking mechanism comprising the parts 83 to 87 is to place a load on the motor so as to hold its speed down to a point at which the speed is determined by the action of the bellows. The centrifugally operated brake is so designed that the breaking action decreases progressively as the speed of the motor increases, the brake ceasing to act entirely between 700 and 800 R. P. M. in this particular instance. Thus, by the combination of a relatively low resistance and a brake for applying a load, I avoid the use of too high a resistance which would result in a high peak voltage surge tending to damage the insulation of the electrical circuit and produce an uneven torque of the motor at low speeds, because a considerable flow of current to the motor is provided even when the make and break mechanism is open. Thus, the use of a centrifugally acting brake which functions to place a load on the motor, in combination with a low resistance connected across the breaker points, gives a smooth running motor which does not require additional insulation of the electrical circuit. Furthermore, by using the brake, it is possible to use a lower resistance which reduces the arcing at the contact points, reduces the radio interference, and reduces the peak voltage across the contact points, which in turn reduces the leakage current through the housing and insulation. As the knob 66 is rotated to an increasingly greater degree, the sleeve 74 moves down the sloping bottom of the groove 78, allowing corresponding movement of the button 76 so that greater pressure is required in the bellows to open the contacts 59 and 61, thus causing the speed of the motor to be maintained uniform at any selected setting of the knob 66. When the speed of the armature passes beyond about 800 R. P. M. the centrifugal brake ceases to apply any load whatever to the motor.

Attention is directed to the fact that the speed regulation is controlled by means of air drawn into the housing through a plurality of openings 88, across the motor and discharged at the rear of the housing through openings 89, at least a part of the air passing through openings 49, so that the regulator not only acts to control the speed of the motor, but acts to cause a circulation or forced draft of air through the motor housing and over the resistance 79, which action is of material assistance in keeping the motor at a fairly low temperature and maintaining uniform speed by the prevention of overheating of the motor.

Attention is now directed to Fig. 8 wherein I have shown a modified form of impeller wherein the pressure is generated in two stages. In this form a pair of impeller chambers 91 and 92 are provided carrying impellers 93 and 94 on the armature shaft 27. The periphery of the chamber 91 is connected with the center of the chamber 92 by a series of channels 95 so that the pressure is built up through multiple stages.

In Fig. 9 I have shown diagrammatically, for the sake of simplicity, a modified form wherein the numeral 96 designates the motor and the numeral 97 the armature shaft, and the numeral 98 the impeller. The pressure is transmitted from the impeller to the bellows 99 through a channel 101. This channel has an orifice 102, discharge through which is regulated by a valve 103 having a manually operated knob 104 for actuating the same. In this form, in order to regulate the speed of the motor, the valve 103 is caused to increase or decrease the flow of air through the port 102. A manually adjustable screw 105 acts to adjust the position of one of the contact points in order to determine the speed range of the motor. In this form the speed adjustments are obtained by adjustment of the valve 103.

In Fig. 10 I have shown an additional fluid means for regulating the motor speed, this figure also being in diagrammatic form for the purpose of simplicity. In this instance the armature shaft 97 of the motor drives the rotor 106 of a rotary pump 107 of the type in which the rotor is eccentrically positioned within the pump casing and carries vanes 108. This pump draws liquid such as oil from a chamber 109 and delivers the same into a channel 111 communicating with a bellows 112. A by-pass 113 is arranged between the channel 111 and the chamber 109, flow through the by-pass being regulated by a needle or screw 114. It will thus be seen that the pressure in the bellows may be regulated by adjusting the needle 114 so as to vary the constant speed at which the motor will be maintained. In this type of control and that shown in Fig. 9 the pressure required within the bellows 112 or 99 to open the contacts remains constant at the different speed settings of the device, more or less of the fluid being by-passed so that the motor is required to travel at a different rate of speed to produce the required pressure in the bellows. The speed of the motor may, however, also be regulated by means of a screw 115 which acts to tilt the insulation ring 56 on a pivotal support 116. A screw 117 acts to adjust the relative position of the rearward contact point, as will be apparent, whereby to determine the low speed setting of the device.

Thus it will be seen that I have provided an improved fluid means of both the pneumatic and hydraulic type for regulating and maintaining the speed of the motor, and I have provided an improved combination of a primary speed controlling device of the make and break type, resistance across the breaker points and centrifugal brake mechanism contributing substantial improvement to the operating characteristics of the motor. I have also provided an improved construction wherein the air used in the speed regulator is drawn into the motor casing and discharged therefrom to create a forced draft over the working parts and cool the same.

I am aware that numerous alterations and changes may be made in the structure as shown and described within the spirit of the invention, and do not wish to be limited except as required by the prior art and the scope of the appended claims, in which—

I claim:

1. The combination in a speed regulator for electric motors of a pair of contacts arranged for relative movement to make and break the circuit of the motor, an impeller carried on the armature shaft of said motor for developing an air pressure proportional to the speed of said shaft, a bellows expansibly responsive to said pressure positioned to relatively move said contacts in response to change in said pressure to make and break the circuit at predetermined speeds, and manually operable means to move said contacts in unison to select a predetermined speed.

2. The combination in a combined motor and speed regulator of a motor, a circuit including make and break mechanism for supplying current to the motor to maintain the same at any predetermined speed within a prescribed range, a second circuit for supplying current to the motor normally such as to cause the motor to run at a speed within said range, and brake means for supplying sufficient load to the motor to reduce the speed under said second circuit to a point below said range.

3. The combination in a combined motor and speed regulator of a motor, a circuit including a make and break mechanism for supplying current to the motor to maintain the same at any predetermined speed within a prescribed range, a resistance shunting said make and break mechanism to supply current to the motor when said circuit is open, said resistance being of such value that the motor runs at a speed within said range, and a centrifugally released brake for applying load to the motor at low speeds to reduce the speed of the motor to a point below said range.

4. The combination in a combined motor and speed regulator of a motor, a circuit including a make and break mechanism for supplying current to the motor to maintain the same at any predetermined speed within a prescribed range, a resistance shunting said make and break mechanism to supply current to the motor when said circuit is open, said resistance being of such value that the motor runs at a speed within said range, and a brake for applying load to the motor at low speeds to reduce the speed of the motor to a point below said range when the make and break mechanism is set at the lower end of said range, said brake being centrifugally operated to progressively release upon increase of the motor speed under the action of said make and break mechanism.

PAUL A. CHAMBERLAIN.